US011926742B2

(12) United States Patent
Hu et al.

(10) Patent No.: US 11,926,742 B2
(45) Date of Patent: Mar. 12, 2024

(54) METHOD FOR PREPARING CARBON BLACK FROM PYROLYSIS CHAR OF WASTE TIRES BY MOLTEN SALT THERMAL TREATMENT AND PRODUCT THEREOF

(71) Applicant: HUAZHONG UNIVERSITY OF SCIENCE AND TECHNOLOGY, Hubei (CN)

(72) Inventors: Hongyun Hu, Hubei (CN); Hua Tang, Hubei (CN); Aijun Li, Hubei (CN); Kang Xie, Hubei (CN); Yuhan Yang, Hubei (CN); Fu Yang, Hubei (CN); Hong Yao, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 562 days.

(21) Appl. No.: 17/273,311

(22) PCT Filed: May 15, 2020

(86) PCT No.: PCT/CN2020/090588
§ 371 (c)(1),
(2) Date: Mar. 4, 2021

(87) PCT Pub. No.: WO2020/233526
PCT Pub. Date: Nov. 26, 2020

(65) Prior Publication Data
US 2021/0317318 A1    Oct. 14, 2021

(30) Foreign Application Priority Data
May 20, 2019   (CN) .......................... 201910417723.4

(51) Int. Cl.
*C09C 1/48*    (2006.01)

(52) U.S. Cl.
CPC .......... *C09C 1/482* (2013.01); *C01P 2006/80* (2013.01)

(58) Field of Classification Search
CPC . C09C 1/482; C09C 1/48; C09C 1/487; C01P 2006/80
(Continued)

(56) References Cited

U.S. PATENT DOCUMENTS 3,996,022 A * 12/1976 Larsen .................... C10B 53/07
44/605
2015/0184079 A1    7/2015 Riedewald

FOREIGN PATENT DOCUMENTS

JP    2003211140    7/2003

OTHER PUBLICATIONS

Definition of edulcorate, accessed online at https://www.merriam-webster.com/dictionary/edulcorate on Nov. 4, 2023 (Year: 2023).*
(Continued)

*Primary Examiner* — Daniel C. McCracken
(74) *Attorney, Agent, or Firm* — JCIP GLOBAL INC.

(57) ABSTRACT

A method for preparing carbon black from pyrolysis char of waste tires by a molten salt thermal treatment and a product thereof are provided. The method includes heating one or two groups of a metal chloride salt group and a metal sulfate group to obtain a molten salt; adding pyrolysis char of waste tires into the molten salt and subjecting same to a molten salt thermal treatment under a preset reaction atmosphere; after the reaction is complete, separating the reaction product to obtain a secondary molten salt and treated pyrolysis char, washing the treated pyrolysis char with hot water and then drying same so as to obtain carbon black, and at the same time, recycling the secondary molten salt.

12 Claims, 1 Drawing Sheet

(58) Field of Classification Search
USPC .......................... 423/449.1–449.9, 450–459
See application file for complete search history.

(56) References Cited

OTHER PUBLICATIONS

Definition of "group," accessed online at https://www.merriam-webster.com/dictionary/group on Nov. 4, 2023 (Year: 2023).*
Di Corcia, et al., Acid-Washed Graphitized Carbon Black for Gas Chromatography, Anal. Chem. 1980; 52: 1345-1350 (Year: 1980).*
"International Search Report (Form PCT/ISA/210) of PCT/CN2020/090588," dated Aug. 13, 2020, with English translation thereof, pp. 1-6.

* cited by examiner

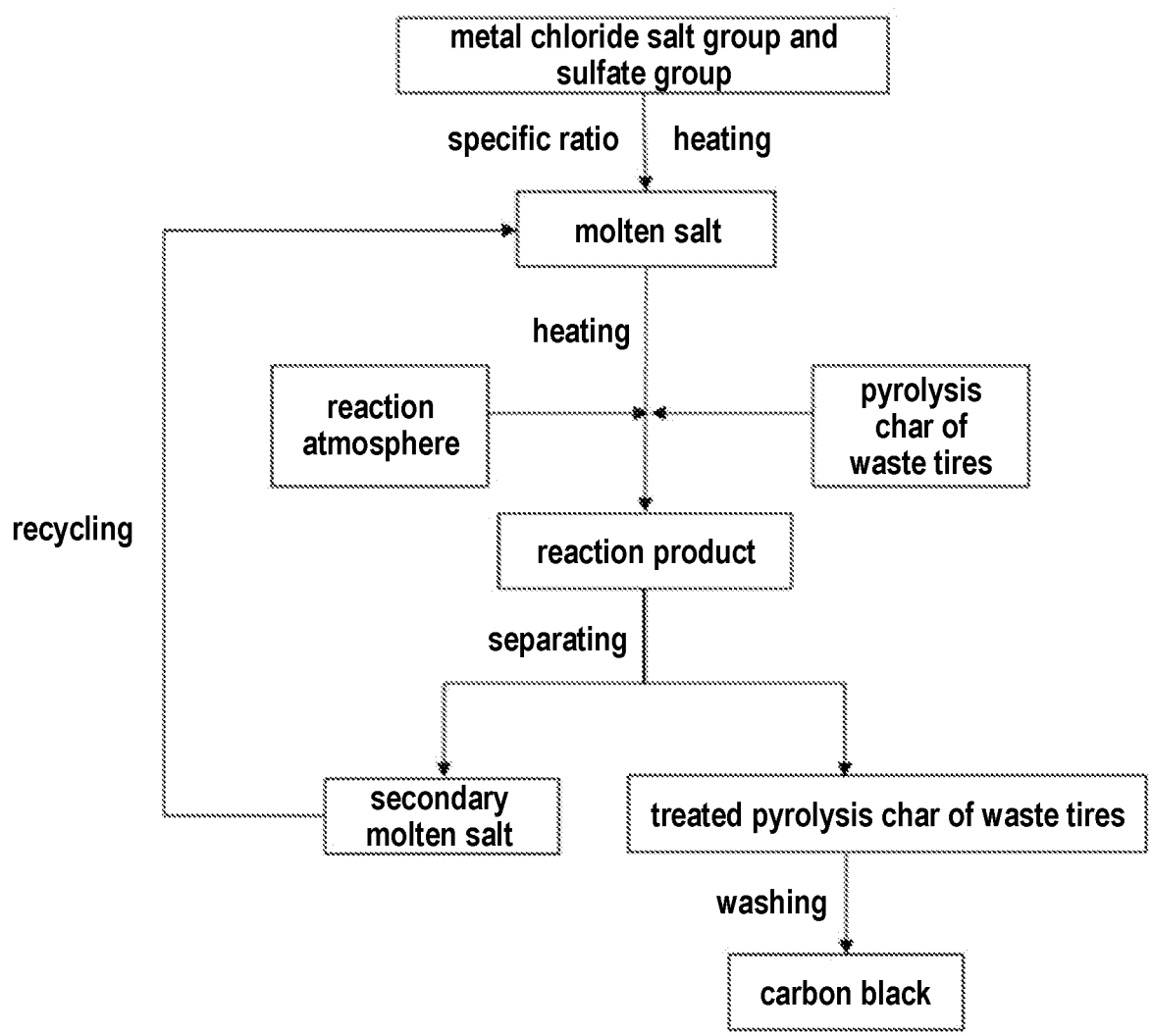

METHOD FOR PREPARING CARBON BLACK FROM PYROLYSIS CHAR OF WASTE TIRES BY MOLTEN SALT THERMAL TREATMENT AND PRODUCT THEREOF

CROSS-REFERENCE TO RELATED APPLICATION

This application is a 371 of international application of PCT application serial no. PCT/CN2020/090588, filed on May 15, 2020, which claims the priority benefit of China application no. 201910417723.4, filed on May 20, 2019. The entirety of each of the above mentioned patent applications is hereby incorporated by reference herein and made a part of this specification.

BACKGROUND

Technical Field

The invention belongs to the technical field of the recycling of organic solid wastes, and in particular, relates a method for preparing carbon black from pyrolysis char of waste tires by a molten salt thermal treatment and a product thereof.

Description of Related Art

With the rapid increase in the number of private cars and the acceleration of the replacement rate, the amount of waste tires produced in China has increased sharply. Statistics show that China produced more than 300 million waste tires, weighing more than 11 million tons, in 2017 alone, ranking first in the world. A tremendous amount of land resources are required for the storage of waste tires, and improper disposal methods may lead to serious resource and environmental problems. It thus can be seen that the recycling of waste tires is an important issue. Thermal treatment technology is a promising solid waste treatment technology because it may be used to effectively recycle resources and energy while achieving rapid volume and weight reduction. CN105950201B discloses a system and method for pyrolyzing waste tires. In the invention, a moving bed pyrolysis reactor is used to pyrolyze waste tires at 450° C. to 550° C. to obtain pyrolysis char, oil, and gas, and resource recycling of the waste tires may thus be effectively achieved. Nevertheless, the pyrolysis products of waste tires, especially the problems of low added values of the pyrolysis char and lack of a broad market, has restricted the promotion of such technology.

In the field of rubber synthesis, the use of carbon black may significantly enhance the rubber's stretching property, tensile strength, tear resistance, and wear resistance, and the service life of rubber products is thereby prolonged. It thus can be seen that increasing attention has been paid to reuse of the carbon black produced by pyrolysis of waste tires to the synthetic rubber, so that high-value recycling of waste tires may be achieved. However, the pyrolytic carbon black of waste tires contains a large amount of carbonaceous deposits and inorganic sulfur, calcium, silicon, and other impurity components. The pyrolytic carbon black thus exhibits poor rubber reinforcement performance and is far from reaching the industrial carbon black standard.

At present, improvement of the quality of pyrolytic carbon black of waste tires and enhancement of rubber reinforcement performance are important issue. CN109096798A discloses a micro-oxidation activation method for pyrolytic carbon black of waste tires. In the method, most of the volatile matter and carbonaceous deposits accumulated on the surface of pyrolytic carbon black are removed through a micro-oxidation process, but the impurity components such as inorganic sulfur, calcium, and silicon in the pyrolysis char may not be removed. CN102504619B discloses waste tires pyrolytic carbon black purification process. Pyrolytic carbon black is repeatedly pickled and alkali washed, so that the contents of ash and volatile matter are reduced, and rubber reinforcement performance is enhanced. CN107379322A discloses a method for recycling tire pyrolysis carbon black. The pyrolytic carbon black of waste tires is purified by removing impurities and is then modified into special carbon black for tires, which is used to make new tires. Nevertheless, in the above two methods, a large amount of nitric acid solution or hydrochloric acid solution is generally used in the process of edulcoration for the pyrolytic carbon black of waste tires. Further, a large amount of acid gases such as carbon dioxide, hydrogen sulfide, etc. may also be produced during the pickling process, and environmental pollution may thus be easily generated.

SUMMARY

According to the above technical defects and/or improvement requirements of the related art, the invention provides a method for preparing carbon black from pyrolysis char of waste tires by a molten salt thermal treatment and a product thereof through which molten salt obtained through heating of a metal chloride salt group and a metal sulfate group is used to perform edulcoration on the pyrolysis char of the waste tires, so that the carbon black is correspondingly produced and environmental pollution is prevented. As such, the invention is particularly suitable for applications such as the resource recycling of waste tires.

To realize the above purpose, according to one aspect of the invention, a method for preparing carbon black from pyrolysis char of waste tires by a molten salt thermal treatment is provided, and the method includes the following steps.

(a) One group or two groups of a metal chloride salt group and a metal sulfate group are heated to obtain a molten salt. The metal chloride salt group includes zinc chloride with a mass fraction of 60% to 100%, and the metal sulfate group includes zinc sulfate with a mass fraction of 60% to 100%.

(b) Pyrolysis char of waste tires is added into the molten salt and is subjected to a molten salt thermal treatment under a preset reaction atmosphere to perform edulcoration on the pyrolysis char of the waste tires.

(c) A reaction product is separated to obtain a secondary molten salt and treated pyrolysis char of the waste tires after the reaction is completed, the treated pyrolysis char of the waste tires is washed with hot water and is dried to obtain carbon black, and the secondary molten salt is recycled.

In a preferred embodiment of the invention, in step (a), the metal chloride salt group and the metal sulfate group are mixed in a mass ratio of 9:1 to 2:3.

In a preferred embodiment of the invention, in step (a), a temperature at which the molten salt is obtained by heating is 200° C. to 600° C.

In a preferred embodiment of the invention, in step (b), a temperature of the molten salt thermal treatment is 200° C. to 600° C., and time of the molten salt thermal treatment is 0.5 h to 5 h.

In a preferred embodiment of the invention, in step (b), a mass ratio of the pyrolysis char of the waste tires to the molten salt is 1:5 to 1:20.

In a preferred embodiment of the invention, in step (b), the preset reaction atmosphere includes an inert atmosphere, a mixed atmosphere of an inert gas and hydrogen chloride, a mixed atmosphere of an inert gas and water vapor, or a mixed atmosphere of an inert gas, hydrogen chloride, and water vapor.

In a preferred embodiment of the invention, in step (b), in the preset reaction atmosphere, a volume fraction of the hydrogen chloride is less than 2%, and a volume fraction of the water vapor is less than 20%.

According to another aspect of the invention, carbon black prepared through the foregoing method is provided.

In general, the above technical solutions provided by the invention have the following technical advantages compared to the related art.

1. In the invention, the impurity components such as inorganic sulfur, calcium, ferrosilicon, etc. in the pyrolysis char of the waste tires are dissolved out owing to the melting properties of the molten salt, thereby avoiding the use of strong acids and bases such as nitric acid, hydrochloric acid, or alkali liquor. The metal chloride salt, especially zinc chloride, is be used to enhance a low temperature melting property of the molten salt, and a mild condition is thus required by the thermal treatment of the molten salt. Moreover, acidic gases, such as hydrogen sulfide and hydrogen chloride, are captured in situ by the metal sulfate especially zinc sulfate, and in this way, environmental pollution caused by the pyrolysis char of the waste tires is effectively reduced. In addition, in the process of the molten salt thermal treatment, carbonaceous deposits accumulated on the surface of pyrolysis char of the waste tires are further decomposed, and the carbon black structure inside the pyrolysis char is disposed. As such, the surface activity of the pyrolysis char of the waste tires after being subjected to the molten salt thermal treatment is enhanced, and the reinforcement performance of rubber is improved.

2. The invention is highly adaptable and may be applied to pyrolysis char of various particle sizes. Further, the liquid molten salt has fluidity and thus may be easily used to perform product separation. The separated secondary molten salt may be recycled for reuse for many times. The impurity components dissolved out in the pyrolysis char of the waste tires are enriched after the molten salt is recycled for multiple times, which is convenient for subsequent disposal or resource recycling.

3. Further, in the invention, the ratio of the metal chloride salt group to the metal sulfate group is optimized, and in this way, the molten salt may exhibit favorable melting properties at low temperatures. Properties of the inorganic sulfur, calcium, silicon, iron, and other impurity components in the pyrolysis char of the waste tires to be dissolved out are further strengthened. The impurity components are fixed in the molten salt by the reaction of the specific molten salt component and harmful impurities. The dissolution process is facilitated, and thereby, the content of impurities in the carbon black is reduced, and the molten salt is further ensured to exhibit good recycling properties.

4. In addition, in the invention, by controlling the reaction temperature, reaction time, reaction atmosphere, and raw material ratios in the molten salt thermal treatment of the pyrolysis char of the waste tires, the effect of edulcoration of the pyrolysis char of the waste tires is ensured, so the invention is economical and is suitable for industrial production.

BRIEF DESCRIPTION OF THE DRAWINGS

FIG. 1 is a flow chart or a process for preparing carbon black from pyrolysis char of waste tires by a molten salt thermal treatment according to an embodiment of the invention.

DESCRIPTION OF THE EMBODIMENTS

To better illustrate the goal, technical solutions, and advantages of the invention, the following embodiments accompanied with drawings are provided so that the invention are further described in detail. It should be understood that the specific embodiments described herein serve to explain the invention merely and are not used to limit the invention. In addition, the technical features involved in the various embodiments of the invention described below can be combined with each other as long as the technical features do not conflict with each other.

As shown in FIG. 1, the invention provides a method for preparing carbon black from pyrolysis char of waste tires by a molten salt thermal treatment, and the method includes the following steps:

(a) heating one group or two groups of a metal chloride salt group and a metal sulfate group to obtain a molten salt, where the metal chloride salt group includes zinc chloride with a mass fraction of 60% to 100%, and the metal sulfate group includes zinc sulfate with a mass fraction of 60% to 100%;

(b) adding pyrolysis char of waste tires into the molten salt and subjecting same to a molten salt thermal treatment under a preset reaction atmosphere to perform edulcoration on the pyrolysis char of the waste tires; and (c) separating a reaction product to obtain a secondary molten salt and treated pyrolysis char of the waste tires after the reaction is completed, washing the treated pyrolysis char of the waste tires with hot water and drying same to obtain carbon black, recycling the secondary molten salt at the same time.

To be specific, ins step (a), the metal chloride salt group includes zinc chloride with a mass fraction of 60% to 100%. The metal chloride salt, especially zinc chloride, may be used to enhance a low temperature melting property of the molten salt, a mild condition is thus required by a thermal treatment of the molten salt, and impurity components may also be easily dissolved out at low temperatures. An amount of the zinc chloride added according to this percentage range may ensure that the molten salt maintains a good molten ion state at low temperatures. If the percentage of the zinc chloride is excessively low, a melting point of the molten salt may increase. As such, the molten salt may not be sufficiently melted at low temperatures, so the impurity components may not be easily dissolved out.

The metal sulfate group includes zinc sulfate with a mass fraction of 60% to 100%. Metal sulfate, especially zinc sulfate, may oxidize sulfide in the pyrolysis char of the waste tires in the molten ion state. In this way, a large amount of sulfur in the pyrolysis char of the waste tires enters the molten salt and is fixed and may also react with acidic gases such as hydrogen chloride and hydrogen sulfide to be fixed in the molten salt, and pollution caused by sulfide is thereby effectively prevented. Zinc sulfate may react with sulfide during the reaction and may thus be consumed. If an initial content of the zinc sulfate is excessively low, it is obvious that less effect may be generated by the molten salt, which is not conducive to the recycling of the molten salt.

The metal chloride salt group and the metal sulfate group are mixed in a mass ratio of 9:1 to 2:3. A stable molten eutectic with a low melting point may be formed if mixing is performed according to this ratio range, and further, impurity components may be easily dissolved out, and sulfide may be easily oxidized.

Moreover, a temperature at which the molten salt is obtained by heating is 200° C. to 600° C. in step (a), and a temperature of the molten salt thermal treatment is 200° C. to 600° C. in step (b). The time of the molten salt thermal treatment is 0.5 h to 5 h, and the stable molten eutectic may be obtained under such temperature range. As such, edulcoration may be performed on the pyrolysis char of the waste tires through the molten salt, and further, decomposition of the molten salt, which may lead to failure of the reaction, is prevented from occurring.

Moreover, in step (b), a mass ratio of the pyrolysis char of the waste tires to the molten salt is 1:5 to 1:20. Through allowing that the molten salt to be excessive to a certain extent relative to the pyrolysis char of the waste tires, the edulcoration process may be completely reacted. When excessive molten salt is provided, the effect of improvement of edulcoration becomes less obvious and is less economical.

Moreover, in step (b), the preset reaction atmosphere includes an inert atmosphere, a mixed atmosphere of an inert gas and hydrogen chloride, a mixed atmosphere of an inert gas and water vapor, or a mixed atmosphere of an inert gas, hydrogen chloride, and water vapor. Hydrogen chloride may react with impurity components such as zinc sulfide in hot molten salt to form chloride. The chloride is easily soluble in the molten salt, so that migration of the impurity components to the molten salt is facilitated. Nevertheless, an excessively high concentration of hydrogen chloride may cause a reactor to be corroded, so it is necessary to ensure that a volume fraction of the hydrogen chloride in the preset atmosphere is less than 2%. Further, water vapor may ionize more $H^+$ and $OH^-$ in the molten salt, and reactivity of the molten salt is thereby enhanced. In order to ensure that the water vapor may be fully ionized without having a major impact on a thermal balance of the molten salt, it is necessary to ensure that a volume fraction of the water vapor is less than 20%.

The invention is further described in detail according to the following specific embodiments.

EXAMPLE 1

(a) Zinc chloride with a mass fraction of 60%, sodium chloride with a mass fraction of 20%, and potassium chloride with a mass fraction of 20% were mixed, heated to 200° C., and then kept warm for 4 hours to obtain molten salt.

(b) Pyrolysis char of waste tires was added to the molten salt, and a mass ratio of the pyrolysis char of the waste tires to the molten salt was 1:5. Hydrogen chloride with a volume fraction of 1.3%, nitrogen gas with a volume fraction of 42.7%, and argon gas with a volume fraction of 56% were introduced into a reactor, and the molten salt thermal treatment was carried out in this atmosphere. The treatment temperature was 200° C., and the treatment time was 5 hours.

(c) A reaction product was separated to obtain a secondary molten salt and treated pyrolysis char of the waste tires after the reaction was completed, the treated pyrolysis char of the waste tires was washed with hot water at 30° C. and was dried to obtain carbon black, and the secondary molten salt was recycled.

In Example 1, after being subjected to the molten salt thermal treatment, the pyrolysis char of the waste tires had a sulfur removal rate reaching 50.7%, a calcium removal rate reaching 79.7%, a silicon removal rate reaching 30.3%, and an iron removal rate reaching 45.1%.

EXAMPLE 2

(a) Zinc sulfate with a mass fraction of 60%, sodium sulfate with a mass fraction of 20%, and potassium sulfate with a mass fraction of 20% were mixed, heated to 600° C., and then kept warm for 4 hours to obtain molten salt.

(b) Pyrolysis char of waste tires was added to the molten salt, and a mass ratio of the pyrolysis char of the waste tires to the molten salt was 1:20. Water vapor with a volume fraction of 20% and nitrogen gas with a volume fraction of 42.7% were introduced into a reactor, and a molten salt thermal treatment was carried out in this atmosphere. The treatment temperature was 600° C., and the treatment time was 1 hour.

(c) A reaction product was separated to obtain a secondary molten salt and treated pyrolysis char of the waste tires after the reaction was completed, the treated pyrolysis char of the waste tires was washed with hot water at 90° C. and was dried to obtain carbon black, and the secondary molten salt was recycled.

In Example 2, after being subjected to the molten salt thermal treatment, the pyrolysis char of the waste tires had a sulfur removal rate reaching 70.3%, a calcium removal rate reaching 90.8%, a silicon removal rate reaching 33.2%, and an iron removal rate reaching 38.2%.

EXAMPLE 3

(a) The metal chloride salt group and the metal sulfate group were mixed in a mass ratio of 9:1, heated to 450° C., and kept warm for 4 hours to obtain molten salt. The metal chloride salt group included zinc chloride with a mass fraction of 90%, sodium chloride with a mass fraction of 5%, and potassium chloride with a mass fraction of 5%. The metal sulfate group included zinc sulfate with a mass fraction of 60%, sodium sulfate with a mass fraction of 20%, and potassium sulfate with a mass fraction of 20%.

(b) Pyrolysis char of waste tires was added to the molten salt, and a mass ratio of the pyrolysis char of the waste tires to the molten salt was 1:10. Mixed gas of nitrogen gas and argon gas was introduced into a reactor, and the molten salt thermal treatment was carried out in this atmosphere. The treatment temperature was 450° C., and the treatment time was 2 hours.

(c) A reaction product was separated to obtain a secondary molten salt and treated pyrolysis char of the waste tires after the reaction was completed, the treated pyrolysis char of the waste tires was washed with hot water at 50° C. and was dried to obtain carbon black, and the secondary molten salt was recycled.

In Example 3, after being subjected to the molten salt thermal treatment, the pyrolysis char of the waste tires had a sulfur removal rate reaching 78.2%, a calcium removal rate reaching 66.5%, a silicon removal rate reaching 86.4%, and an iron removal rate reaching 39.5%.

EXAMPLE 4

(a) The metal chloride salt group and the metal sulfate group were mixed in a mass ratio of 2:3, heated to 550° C., and kept warm for 4 hours to obtain molten salt. The metal chloride salt group included zinc chloride with a mass fraction of 60%, sodium chloride with a mass fraction of 20%, and potassium chloride with a mass fraction of 20%. The metal sulfate group included zinc sulfate with a mass fraction of 90%, sodium sulfate with a mass fraction of 5%, and potassium sulfate with a mass fraction of 5%.

(b) Pyrolysis char of waste tires was added to the molten salt, and a mass ratio of the pyrolysis char of the waste tires to the molten salt was 1:10. Hydrogen chloride with a volume fraction of 2%, water vapor with a volume fraction of 4%, and nitrogen gas with a volume fraction of 94% were introduced into a reactor, and the molten salt thermal treatment was carried out in this atmosphere. The treatment temperature was 550° C., and the treatment time was 0.5 hours.

(c) A reaction product was separated to obtain a secondary molten salt and treated pyrolysis char of the waste tires after the reaction was completed, the treated pyrolysis char of the waste tires was washed with hot water at 70° C. and was dried to obtain carbon black, and the secondary molten salt was recycled.

In Example 4, after being subjected to the molten salt thermal treatment, the pyrolysis char of the waste tires had a sulfur removal rate reaching 67.0%, a calcium removal rate reaching 87.3%, a silicon removal rate reaching 48.3%, and an iron removal rate reaching 77.6%.

EXAMPLE 5

(a) Zinc chloride and zinc sulfate were mixed in a mass ratio of 5:1, heated to 300° C., and kept warm for 4 hours to obtain molten salt.

(b) Pyrolysis char of waste tires was added to the molten salt, and a mass ratio of the pyrolysis char of the waste tires to the molten salt was 1:15. Hydrogen chloride with a volume fraction of 1%, water vapor with a volume fraction of 10%, and argon gas with a volume fraction of 89% were introduced into a reactor, and the molten salt thermal treatment was carried out in this atmosphere. The treatment temperature was 300° C., and the treatment time was 3.5 hours.

(c) A reaction product was separated to obtain a secondary molten salt and treated pyrolysis char of the waste tires after the reaction was completed, the treated pyrolysis char of the waste tires was washed with hot water at 70° C. and was dried to obtain carbon black, and the secondary molten salt was recycled.

In Example 5, after being subjected to the molten salt thermal treatment, the pyrolysis char of the waste tires had a sulfur removal rate reaching 60.2%, a calcium removal rate reaching 81.6%, a silicon removal rate reaching 65.4%, and an iron removal rate reaching 44.9%.

A person having ordinary skill in the art should be able to easily understand that the above description is only preferred embodiments of the invention and is not intended to limit the invention. Any modifications, equivalent replacements, and modifications made without departing from the spirit and principles of the invention should fall within the protection scope of the invention.

What is claimed is:

1. A method for preparing carbon black from pyrolysis char of waste tires by a molten salt thermal treatment, comprising:
   (a) heating one group or two groups of a metal chloride salt group and a metal sulfate group to obtain a molten salt, wherein the metal chloride salt group comprises zinc chloride with a mass fraction of 60% to 100%, and the metal sulfate group comprises zinc sulfate with a mass fraction of 60% to 100%;
   (b) adding pyrolysis char of waste tires into the molten salt and subjecting same to a molten salt thermal treatment under a preset reaction atmosphere to perform edulcoration on the pyrolysis char of the waste tires; and
   (c) separating a reaction product to obtain a secondary molten salt and treated pyrolysis char of the waste tires after the reaction is completed, washing the treated pyrolysis char of the waste tires with hot water and drying same to obtain carbon black, recycling the secondary molten salt.

2. The method for preparing the carbon black from the pyrolysis char of the waste tires by the molten salt thermal treatment according to claim 1, wherein in step (a), the metal chloride salt group and the metal sulfate group are mixed in a mass ratio of 9:1 to 2:3.

3. The method for preparing the carbon black from the pyrolysis char of the waste tires by the molten salt thermal treatment according to claim 2, wherein in step (a), a temperature at which the molten salt is obtained by heating is 200° C. to 600° C.

4. The method for preparing the carbon black from the pyrolysis char of the waste tires by the molten salt thermal treatment according to claim 2, wherein in step (b), the preset reaction atmosphere includes an inert atmosphere, a mixed atmosphere of an inert gas and hydrogen chloride, a mixed atmosphere of an inert gas and water vapor, or a mixed atmosphere of an inert gas, hydrogen chloride, and water vapor.

5. The method for preparing the carbon black from the pyrolysis char of the waste tires by the molten salt thermal treatment according to claim 1, wherein in step (a), a temperature at which the molten salt is obtained by heating is 200° C. to 600° C.

6. The method for preparing the carbon black from the pyrolysis char of the waste tires by the molten salt thermal treatment according to claim 5, wherein in step (b), the preset reaction atmosphere includes an inert atmosphere, a mixed atmosphere of an inert gas and hydrogen chloride, a mixed atmosphere of an inert gas and water vapor, or a mixed atmosphere of an inert gas, hydrogen chloride, and water vapor.

7. The method for preparing the carbon black from the pyrolysis char of the waste tires by the molten salt thermal treatment according to claim 1, wherein in step (b), a temperature of the molten salt thermal treatment is 200° C. to 600° C., and time of the molten salt thermal treatment is 0.5 h to 5 h.

8. The method for preparing the carbon black from the pyrolysis char of the waste tires by the molten salt thermal treatment according to claim 7, wherein in step (b), the preset reaction atmosphere includes an inert atmosphere, a mixed atmosphere of an inert gas and hydrogen chloride, a mixed atmosphere of an inert gas and water vapor, or a mixed atmosphere of an inert gas, hydrogen chloride, and water vapor.

9. The method for preparing the carbon black from the pyrolysis char of the waste tires by the molten salt thermal treatment according to claim 1, wherein in step (b), a mass ratio of the pyrolysis char of the waste tires to the molten salt is 1:5 to 1:20.

10. The method for preparing the carbon black from the pyrolysis char of the waste tires by the molten salt thermal treatment according to claim 9, wherein in step (b), the preset reaction atmosphere includes an inert atmosphere, a mixed atmosphere of an inert gas and hydrogen chloride, a mixed atmosphere of an inert gas and water vapor, or a mixed atmosphere of an inert gas, hydrogen chloride, and water vapor.

11. The method for preparing the carbon black from the pyrolysis char of the waste tires by the molten salt thermal treatment according to claim 1, wherein in step (b), the preset reaction atmosphere includes an inert atmosphere, a mixed atmosphere of an inert gas and hydrogen chloride, a mixed atmosphere of an inert gas and water vapor, or a mixed atmosphere of an inert gas, hydrogen chloride, and water vapor.

12. The method for preparing the carbon black from the pyrolysis char of the waste tires by the molten salt thermal treatment according to claim 11, wherein in step (b), in the preset reaction atmosphere, a volume fraction of the hydrogen chloride is less than 2%, and a volume fraction of the water vapor is less than 20%.

\* \* \* \* \*